United States Patent [19]

Williams

[11] 4,425,812

[45] Jan. 17, 1984

[54] ENGINE STARTER DRIVE DEVICE

[75] Inventor: James O. Williams, Horseheads, N.Y.

[73] Assignee: Facet Enterprises, Incorporated, Tulsa, Okla.

[21] Appl. No.: 250,508

[22] Filed: Apr. 2, 1981

[51] Int. Cl.[3] .................... F02N 15/06; F16D 43/06

[52] U.S. Cl. .................................... 74/6; 74/7 R; 192/114 R

[58] Field of Search .................... 74/6, 7 R, 7 A; 192/114 R

[56] References Cited

U.S. PATENT DOCUMENTS

| | | | |
|---|---|---|---|
| 3,263,509 | 8/1966 | Digby | 74/6 |
| 3,798,977 | 3/1974 | Digby | 74/6 |
| 3,915,020 | 10/1975 | Johnson | 74/6 |
| 4,322,985 | 4/1982 | Mortensen | 74/6 |
| 4,346,615 | 8/1982 | Yoneda et al. | 74/7 A |

*Primary Examiner*—Allan D. Hermann
*Attorney, Agent, or Firm*—VanOphem, Remy J.

[57] ABSTRACT

An engine starter drive device having a sleeve member slidably and mounted for rotation on a power shaft of a motor is disclosed. The sleeve is connected to a mounting shaft which is mounted adjacent to the power shaft. A pinion gear is mounted on the mounting shaft. A driving clutch member is mounted on external helical splines formed on the sleeve. The driving member is connected in one direction of rotation to a driven clutch member by axially extending clutch teeth. The driven member is connected to the pinion gear for rotation therewith. Between the driving and driven clutch members is a centrifugal separator member which moves the driving clutch member away from the driven clutch member above a predetermined rotational speed. The pinion gear thus is mounted on that portion of the mounting shaft that is isolated from the outer environment.

19 Claims, 3 Drawing Figures

ENGINE STARTER DRIVE DEVICE

FIELD OF THE INVENTION

The present invention relates to engine starters for internal combustion engines and more particularly to starters of the positive shift type.

BACKGROUND OF THE INVENTION

Engine starter gear devices operate in an extremely hostile work environment. The starter is usually bolted to the engine with the pinion gear adjacent to the ring gear. In most automotive applications, the starter is secured to the engine so as to permit access and serviceability from the bottom of the vehicle or underneath the engine. Because of these considerations, the starter motor and more particularly the starter gearing is subjected to dirt, dust, rain, snow, ice, salt, moisture, corrosion, heat, cold and oil. In spite of this work environment, the starter gearing device must perform several critical funtions in an extremely short period of time, if the engine is to be started satisfactorily. These critical functions include shifting, indexing, driving overrunning and disengagement when the engine becomes self-operative.

The prior art developments have resulted in engine starter gearing devices having a unidirectional torque transmitting clutch. In addition, the prior art starter gearing devices also include a mechanism for indexing the pinion gear of the starter with the engine's ring gear when an abutting condition exists between the pinion gear and the engine ring gear. Finally, the prior art starter gearing devices include mechanisms for separating the clutch teeth within the starter when the pinion gear of the starter rotates at a faster speed than the starter shaft. However, because of the hostile work environment of the starters, it has been found that the pinion gear cannot be permitted to rest directly on the armature shaft, especially in cold weather when fine matter, oil and moisture tend to freeze on the shaft. It has been found that these obstructions on the armature shaft can restrict the axial travel of the pinion gear and cause the pinion gear to index prematurely, that is, before the pinion gear abuts against the ring gear. This can cause milling of the engine ring gear and premature failure of the starter.

In some prior art starters, for example, U.S. Pat. No. 3,263,509 issued to Digby on Aug. 2, 1966 and owned by the assignee of the present patent application, a sleeve member is mounted between the pinion and the armature shaft to eliminate the relative motion between the armature shaft and the pinion gear. Thus, the sleeve member, as it is moved axially on the armature shaft, scrapes the outer diameter of the armature shaft to remove the dirt, moisture, etc. thereon without causing the pinion gear to index prematurely. The use of a sleeve member, however, severely restricts the choice of pinion size and because of this physical constraint prevents the use of smaller pinion drives on such starter devices.

Other examples of prior art engine starter gearing requiring a sleeve member between the armature shaft and the pinion are shown in U.S. Pat. No. 3,905,245 issued to Harold Mortenson on Sept. 16, 1975, owned by the assignee of the present patent application; U.S. Pat. No. 3,915,020, issued to Irving Johnson on Oct. 28, 1975, owned by the assignee of the present patent application; and U.S. patent application Ser. No. 132,012 filed on Mar. 20, 1980, by Harold O. Mortenson.

None of the aforementioned prior art designs has been ablé to eliminate the use of a sleeve member between the armature shaft and the pinion because dirt or other obstructions on the armature shaft could make the pinion gear index prematurely. Thus, none of the aforementioned designs is able to reduce the physical size of the pinion member in order to permit the use of small pinion gear designs for small drive applications which do not index prematurely when dirt, oil, water, etc. adhere to the exterior of the armature shaft.

BRIEF SUMMARY OF THE INVENTION

The present invention provides an engine starter gear device of the positive shift type that is compact and permits the use of smaller drive pinions than currently permitted in known prior art designs. In addition, the present invention eliminates the need for a sleeve under the pinion gear by eliminating the relative movement between the prior art sleeves and the armature shaft.

The present invention provides an engine starter gear device for mounting on a power shaft of a motor. The starter gear device includes a sleeve member slidably and nonrotatably mounted on the power shaft, the sleeve having one end portion and another end portion opposite the one end portion. The sleeve memberfurther has external helical splines formed on the one end portion and an outer diameter on the other end portion. The mounting shaft is coaxially mounted adjacent to the power shaft. The mounting shaft has a first end, a second end opposite the first end, and a first outer diameter adjacent the first end. The second end is connected to the one end portion for movement therewith. A pinion gear is mounted on the first outer diameter of the mounting shaft for rotation therewith. The pinion gear further moves axially into and out of engagement with the gear of the engine to be started. A driving clutch member is coaxially disposed with the mounting shaft. The driving clutch member has one end and an opposite end. The one end has first axially extending dentil clutch teeth. The opposite end is slidably mounted on the external helical splines of the sleeve member. An annular driven clutch member is interposed the pinion gear and the driving clutch member. The annular driven clutch member has a first end secured to the pinion gear and a second end opposite the first end. The second end has second axially extending dentil clutch teeth to engage the first axially extending dentil clutch teeth on the driving member. The first and second axially extending dentil clutch teeth have inclined complimentary mutually engageable inclined teeth for transmitting torque between the driving and driven clutch members in one direction of relative rotation. Finally, the driving clutch member is axially moved away from the driven clutch member by a centrifugal separating mechanism when the driven clutch member rotates above a predetermined rotational speed.

It is, therefore, a primary object of the present invention to provide an engine starter gear device that provides for shifting, indexing, driving, overrunning and disengagement when the engine becomes self-operative and which eliminates the need for a sleeve member between the pinion gear and the armature shaft so that smaller pinion gears can be used for small engine applications which do not prematurely index because of contamination on the exterior of the armature shaft.

It is another object of the present invention to provide a starter gear for use with small pinion applications which eliminates the need for a sleeve member between the pinion and the armature shaft and which utilizes a form of construction which is adaptable to simpler and lower cost assembly techniques.

The above and other objects and teachings of the invention will become apparent from the following detailed description taken from the drawings and the claims which form a part of this specification.

DETAILED DESCRIPTION OF THE PREFERRED EMBODIMENT

Figure 1:
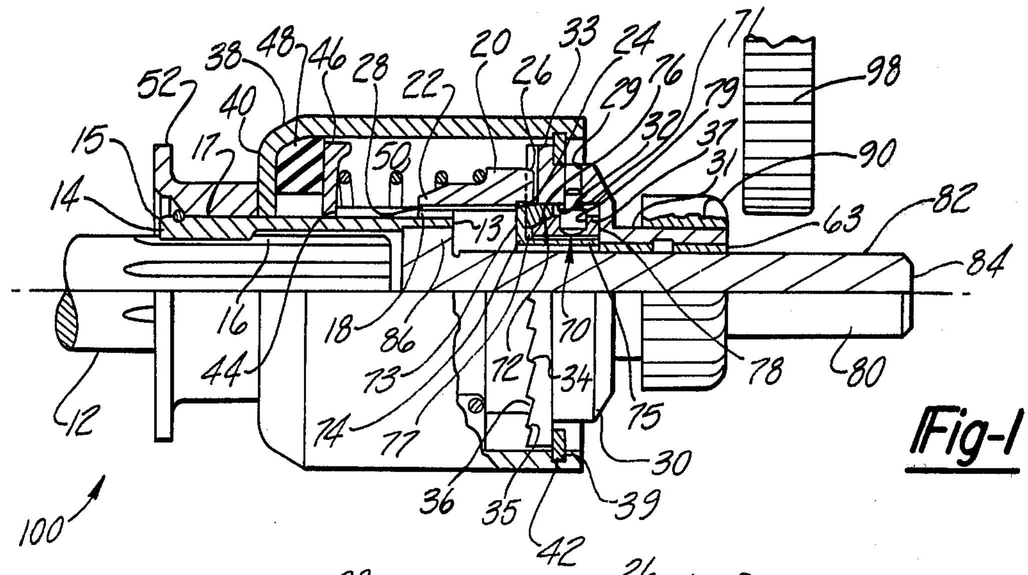
FIG. 1 is a detailed partial side cutaway view and partial sectional view of the engine starter gear device of the present invention when the engine starter gear device being at rest.
Figure 2:
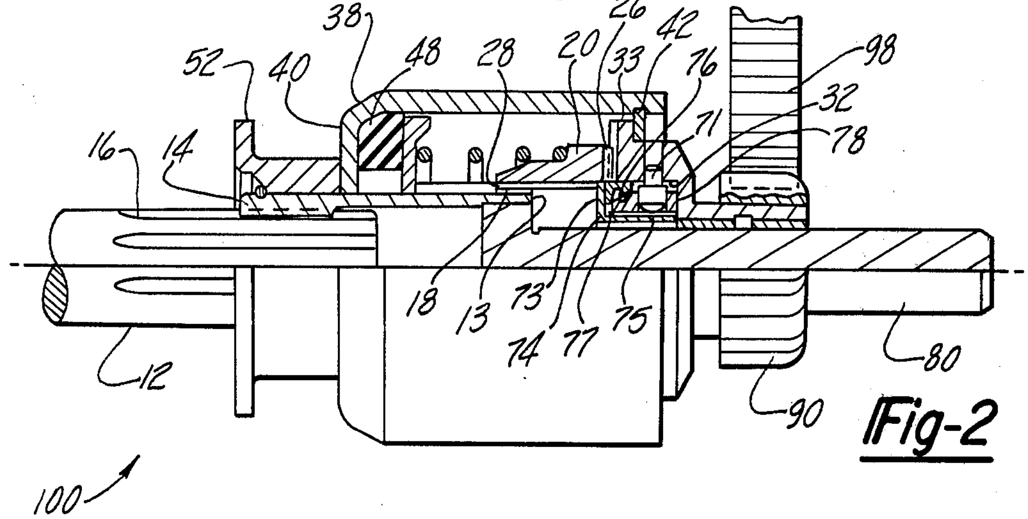
FIG. 2 is a detailed partial side and partial sectional view of the engine starter gear device of FIG. 1 with the pinion gear thereof engaging an engine ring gear.
Figure 3:
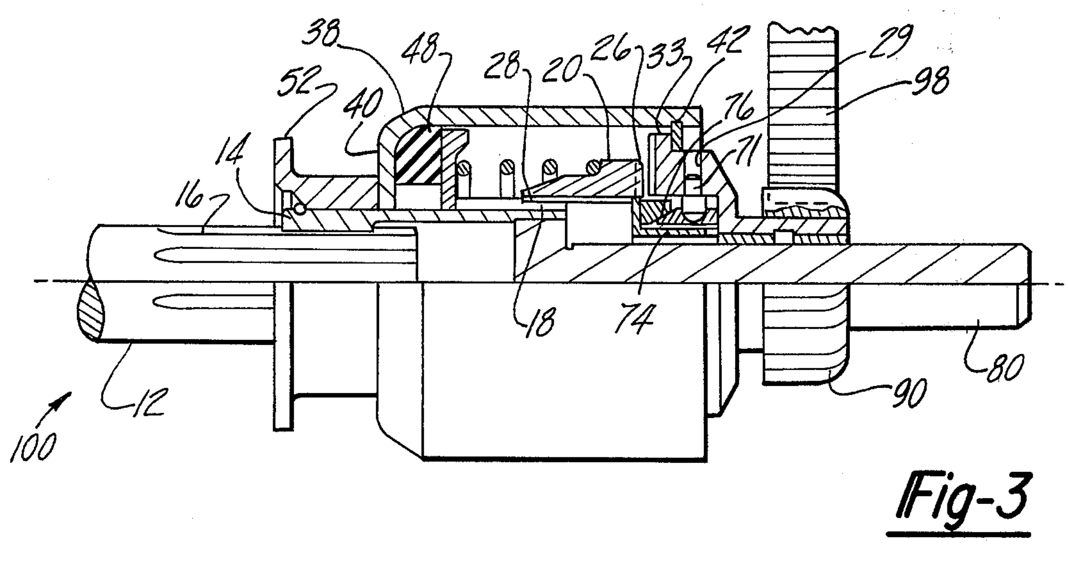
FIG. 3 is a detailed partial side and partial sectional view of the engine starter gear device of FIG. 1 when clutch teeth of the driving and driven member are separated after the starter gear engages the engine ring gear and the ring gear overruns the starter.

Referring to FIG. 1, there is illustrated a engine starter gear device generally designated by the numeral 100 for an internal combustion engine. The starter gear device 100 is mounted on a power shaft 12 of a starting motor (not illustrated). The starter gear device 100 includes a sleeve member 14 which is connected to the power shaft 12 by means of straight splines 16 so that the sleeve member 14 is axially but nonrotatably moveable relative to the power shaft 12. The sleeve member 14 further has one end 13 and another end 15 opposite the one end 13. The outside surface of the sleeve member 14 at its one end 13 has external helical splines 18 formed thereon and an outer diameter 17 extending from the external helical splines 18 to the other end 15.

A driving clutch member 20 has helical splines 28 on its inner most diameter on its end portion 22 adjacent the opposite end portion 13 of the sleeve member 14. The helical splines 28 of the driving clutch member 20 are mounted on the external helical splines 18 on the sleeve member 14 for relative movement therewith. The one end portion 26 of the driving clutch member 20 has axially extending clutch teeth 34 which are coaxially disposed with respect to the sleeve member 14 and the power shaft 12. Beneath the axially extending clutch teeth 34 near the one end portion 26 of the driving clutch member 20 is a counterbore 24 for a purpose to be described later on herein.

A mounting shaft 80 is coaxially mounted adjacent to the power shaft 12. The mounting shaft 80 is connected at its second end 86 to the one end 13 of the sleeve member 14 such that the mounting shaft 80 rotates with the power shaft 12.

A pinion gear 90 is slidably journaled on a bearing 63 which is, in turn, mounted on the first outer diameter 82 of the mounting shaft 80. The pinion gear 90 is adapted to move axially along the mounting shaft 80 toward its first end 84 for movement into and out of engagement with the engine gear 98 of the engine to be started (not shown).

An annular driven clutch member 30 is integrally formed with the pinion gear 90. Thus, the first end portion 31 of the annular driven clutch member 30 extends axially from the pinion gear 90. The second end 33 of the driven clutch member 30 has axially extending clutch teeth 36 which cooperatively engage the driving clutch teeth 34. The clutch teeth 34 and 36 are provided with mutually engageable inclined torque transmitting surfaces 35. The clutch teeth 34 and 36 respectively are of the sawtooth variety to provide an unidirectional overrunning clutch connection between the driven clutch member 30 and the driving clutch member 20. The second end 33 of the driven clutch member 30 further has a counterbore 32 for a purpose to be described later on herein.

A barrel shaped housing 38 has a closed end 40 and an opposite end portion coaxially aligned with respect to the closed end 40. The closed end 40 is mounted onto the outer diameter 17 of the sleeve member 14. A lock ring 42 is seated in an annular groove 39 adjacent to the opposite end portion of the housing 38. Thus, the barrel shaped housing 38 extends axially a predetermined length so as to confine the driving and driven clutch members 20, 30 respectively within the housing cavity by means of the locking ring 42 abutting against a shoulder portion of the annular driving clutch member 30.

The sleeve member 14 is formed with a radial shoulder 44 formed between the helical splines 18 and the outer diameter 17 on the sleeve member 14. The radial shoulder 44 provides an axial abutment for the thrust washer 46 which is mounted on the sleeve member 14. A resiliently yieldable cylinder member 48, preferably of an elasticly deformable material such as rubber, is inserted in the cavity between the closed end 40 of the barrel shaped housing 38 and the one side of the thrust washer 46 which abuts against the radial shoulder 44. In addition, a helical biasing member 50 is compressively confined between a radial shoulder portion formed on the other side of the thrust washer 46 and a radial shoulder formed on the driving clutch member 20 so as to provide a biasing force to urge the clutch teeth 34 and 36 into an engaged position.

The starter gearing device 100 is moved axially along the power shaft 12 into and out of engagement with the engine gear 98 by any well known solenoid, air or hydraulic cylinder actuated level (not shown). The lever is connected to the shaft collar 52 which is secured to the outer diameter 17 of the sleeve member 14 and connected adjacent to the closed end 40 of the barrel shaped housing 38.

The separation of the driven clutch member 30 and the driving clutch member 20 during the overrunning condition is accomplished by a separator means 70. The separator means 70 comprises annular ring member 72 having an inner inclined surface 76. The annular ring member 72 abuts against the collar member 74. The outer edge of the radially extending portion 73 of the collar member 74 abuts the shoulder in the counterbore 24 of the driving clutch member 20. The collar member 74 further has an axially extending portion 75 which is mounted in the counterbore 32 and is adjacent to but spaced away from the radial shoulder 37 formed by the counterbore 32 in the annular driven clutch member 30. The inner inclined surface 76 of the annular ring member 72 is preferably conically formed with respect to the longitudinal axis of the mounting shaft 80. A plurality of arcuate centrifugal weight members 78 are annularly arranged adjacent the ring member 72. Each weight member 78 has an inclined surface 77 which is complementary with the abutting inclined surface 76 of the annular ring member 72. The centrifugal weight members 78 are mounted so that the inclined surface 77 of the centrifugal weight members 78 abut the inclined surface 76 of the annular ring members 72. A radial hole 79 is formed in each arcuate centrifugal weight member 78. In addition, a support pin 71 is secured on one end in a radial hole 29 formed in the annular recess of the driven clutch member 30. The pin 71 projects radially inward therefrom into the hole 79 in the centrifugal weight member 78. The support pin 71 and the hole connections 29 and 79 respectively, restrain the arcuate centrifugal weight members 78 from movement in either the axial or circumferential direction, while permitting radial movement in response to centrifugal force. The collar member 74 further acts to hold the annular ring member 72, the plurality of arcuate weight member 78 and the support pin 30 together to simplify the assembly of the ring member 72 and weight member 78 to the rest of the device. This makes the assembly of the centrifugal separator parts easier also.

OPERATION

When it is desired to start the internal combustion engine, the starter gear device 100 is shifted toward the engine ring gear 90 by a positioning mechanism (not shown) which is connected through the shift collar 52. The starter gear device 100 is moved along the power shaft 12 so as to shift the mounting shaft 80 so that the pinion gear 90 engages the engine ring gear 98. The starter gear device 100 also has an indexing function in the event that the pinion gear 90 abuts one of the teeth of the engine ring gear 98 which will be described later on herein. The power shaft 12 is rotated by a starting motor (not shown) to transmit torque through the straight splines 16 to the sleeve member 14, then through the helical splines 18 and 28 to the driving clutch member 20, through the mutually engageable clutch teeth 34 and 36 respectively, through the driven clutch member 30, through the pinion gear 90 and then to the engine ring gear 98. In addition, the sleeve member 14 axially moves the mounting shaft 80 to move the pinion gear 90 into engagement with the engine ring gear 98.

After the engine starts and becomes self-operating, the engine gear 98 drives the pinion gear 90 at a speed greater than that of the power shaft 12, that is, in an overrunning condition. In the overrunning condition, the centrifugal separator means 70 becomes operative, in that, the plurality of arcuate centrifugal weights 78 will start to move radially outward along the support pins 71. This radial movement causes an axial thrust on the annular ring 72 through the inclined surfaces 76 and 77. The movement of the plurality of arcuate centrifugal weights 78 in a radial direction along the support pin 71 generates a force which acts on surfaces 76 and 77. This movement of the weights 78 is sufficient to generate an axial force on annular ring 72 to cause the annular ring 72 to move in a direction away from the driven clutch member 30. The collar 74 is thereby caused to move away from the driven clutch member 30 and through its abutting connection at the shoulder of the counterbore 24 causes the driving clutch member 20 to become disengaged from the driven clutch member 30. As this occurs, the driving clutch member 20 moves against the biasing force of the helical biasing member 50 and thereby causes separation of the clutch teeth 32 and 36 respectively at a predetermined engine self-operating speed. This action prevents the clutch teeth 34 and 36 from being subjected to long periods of contact while the pinion gear 90 is rotating at a speed greater than that of the power shaft 12 and the mounting shaft 80.

The starter is further designed to provide an indexing function when the pinion gear 90 abuts one of the teeth of the engine ring gear 98 as when the starter is shifted axially into engagement with the engine ring gear 98. When a tooth abutment occurs between the pinion gear and the engine ring gear, the axial movement of the driven clutch member along the mounting shaft 80 is obstructed by the ring gear tooth in engagement with a pinion gear tooth. However, the shifting mechanism will continue to shift the housing 38, the sleeve member 14 and mounting shaft 80 axially along the longitudinal axis of the power shaft 12 to move the pinion gear 90 axially adjacent to the engine ring gear 98. In this abutting condition, the pinion gear 90 and the driven and driving clutch members 20, 30 respectively will not move axially along the mounting shaft 80 to engage the engine ring gear 98 because of the abutting condition. On the other hand, the sleeve member 14, the housing 38 and the mounting shaft 80 continue to shift axially along the longitudinal axis of the power shaft 12 toward the engine ring gear 98. This continued axial movement of the sleeve member 14, the housing 38 and the mounting shaft 80, along the longitudinal axis of the power shaft 12 toward the engine ring gear 98 forces the driving clutch member 20 to rotate relative to the sleeve member 14 by means of the interengaging helical splines 18 and 28 respectively. This rotation of the driving clutch member 20 by the interengaging helical spline connection is transmitted to the driven clutch member 30 through the clutch teeth 34, 36 so that the pinion gear 90 rotates to clear the obstructing tooth on the engine ring gear 98. As the tooth on the engine ring gear 98 is cleared, the spring 50 snaps the pinion gear 90 and the driven and driving clutch members 20, 30 respectively axially along the mounting shaft 80 toward the first end 84 so that the pinion gear 90 engages the engine ring gear 98.

From the foregoing discussion, it is readily appreciated that the pinion gear 90 and the bearing 63 are axially positioned on the mounting shaft 80 for rotation therewith except under two conditions. The first condition being when a pinion gear tooth abutment occurs with the engine ring gear 98. As previously discussed, the mounting shaft 80 continues to move axially while the pinion gear 90 is obstructed from moving axially along with the mounting shaft 80 by the pinion gear tooth abutment with the engine ring gear 98. The pinion gear 90 will remain in an abutting condition with the engine ring gear 98 while the mounting shaft 80 continues to move axially until the indexing function rotates pinion gear 90 to clear the obstructing pinion gear tooth. When the indexing function is complete, the spring 50 causes the pinion gear 90 and the bearing 63 to slide axially along the outer diameter 82 of the mounting shaft 80 to the axial position that the pinion gear and bearing occupied on the mounting shaft before the abutting condition. Thus, while the pinion gear 90 and the bearing 63 move axially relative to the mounting shaft 80 during this first condition, the pinion gear and bearing do not slide over that portion of the mounting shaft that has dirt, oil, etc. thereon and they slide on that portion of the mounting shaft 80 that is isolated from the outer environment. Therefore, the bearing 63 and the pinion gear 90 are protected from sliding along that portion of the mounting shaft that may be contaminated with dirt, oil, water, etc. as other prior art starter gear devices must operate in. The second condition wherein the pinion gear 90 and the bearing 63 may move relative to the mounting shaft 80 is when the engine starts and becomes self-operating, that is, in the overrunning condition. However, in this overrunning condition the pinion gear 90 and the bearing 63 do not move axially relative to the mounting shaft 80 but merely rotate at a speed faster than the rotation of the mounting shaft 80. Thus, in this condition, the pinion gear and the bearing are also protected from rotating on that portion of the mounting shaft 80 subjected to dirt, oil, moisture, etc., because no axial movement of the pinion gear and the bearing 63 occur relative to the mounting shaft 80.

While the preferred embodiment of the invention has been disclosed, it will be apparent to those skilled in the art that changes may be made to the invention as set forth in the appended claims and, in some instances, certain features of the invention may be used to advantage without corresponding use of other features. Accordingly, it is intended that the drawings, the claims and the description of the preferred embodiment illustrate the principle of the invention herein and not to limit the scope thereof.

What is claimed is:

1. An engine starter drive device for mounting on a power shaft of a motor and for starting an engine having a starter gear, said starter drive device comprising:

a sleeve member slidably mounted on said power shaft for rotation therewith, said sleeve having one end portion and another end portion opposite said one end portion, said sleeve member further having external helical splines formed on said one end portion and an outer diameter extending from said external helical splines to said another end portion;

a mounting shaft coaxially mounted adjacent to said power shaft, said mounting shaft having a first end, a second end opposite said first end and a first outer diameter adjacent to said first end, said second end connected to said one end portion of said sleeve member for movement therewith;

a pinion gear mounted on said first outer diameter of said mounting shaft for relative rotation therewith, said pinion gear further moving axially into and out of engagement with said starter gear;

a driving clutch member coaxially disposed with said mounting shaft, said driving clutch member having one end and an opposite end, said one end having first axially extending dentil clutch teeth, said opposite end being slidably mounted on said external helical splines of said sleeve member;

an annular driven clutch member interposed said pinion gear and said driving clutch member, said annular driven clutch member having a first end secured to said pinion gear and a second end opposite said first end, said second end having second axially extending dentil clutch teeth to engage said first axially extending dentil clutch teeth on said driving member, said first and second axially extending dentil clutch teeth having inclined complementary mutually engageable inclined teeth for transmitting torque between said driving and driven clutch members in one direction of rotation; and means, interposed said driving and driven clutch members, for axially separating said driving clutch member away from said driven clutch member when said driven clutch member rotates above a predetermined rotational speed.

2. An engine starter drive device as claimed in claim 1, further comprising:

means, enclosing said separating means, for preventing the ingress of contaminants from said engine and said motor from interfering with the operation of said separating means.

3. An engine starter device a claimed in claim 1 wherein said means for axially separating said driving clutch member from said driven clutch member comprises centrifugally actuated separating means.

4. An engine starter drive device as claimed in claim 1, further comprising:

a barrel housing having an open end and a closed end opposite said open end, said closed end slidably mounted on said outer diameter on said sleeve member, said barrel housing further extending axially so as to spatially enclose said driving and driven clutch members; and abutment means, mounted within said housing adjacent to said open end, for engaging said driven clutch member within said housing and for confining said driving and driven clutch members within said housing.

5. An engine starter drive device as claimed in claim 4, further comprising:

resilient means, mounted within said housing adjacent said closed end and abutting said driving clutch member, for biasing said driving clutch member into engagement with said driven clutch member.

6. An engine starter drive device as claimed in claim 5, further comprising:

means for axially moving said driving clutch member and said driven clutch member such that said pinion gear engages said starter gear.

7. An engine starter drive device as claimed in claim 6 further comprising:

indexing means for shifting said driving and driven clutch members and said pinion gear into engagement with and toward said starter gear when said pinion gear abuts said starter gear and the obstructing tooth on said starter gear prevents engagement of said pinion gear with said starter gear.

8. An engine starter for starting an engine having a starter gear, said engine starter comprising:

a starter motor having a power shaft;

a sleeve member slidably and nonrotatably mounted on said power shaft, said sleeve having one end portion and another end portion opposite said one end portion, said sleeve member further having external helical splines formed on said one end portion and outer diameter on said another end portion;

a mounting shaft coaxially mounted adjacent to said power shaft, said mounting shaft having a first end, a second end opposite said first end and a first outer diameter adjacent said first end, said second end connected to said one end portion for movement therewith;

a pinion gear mounted on said first outer diameter of said mounting shaft said pinion gear further moving axially into and out of engagement with said starter gear;

a driving clutch member coaxially disposed with said mounting shaft, said driving clutch member having one end and an opposite end, said one end having first axially extending dentil clutch teeth, said opposite end slidably mounted on said external helical splines on said sleeve member;

an annular driven clutch member interposed said pinion gear and said driving clutch member, said annular driven clutch member having a first end secured to said pinion gear and a second end opposite said first end, said second end having second axially extending dentil clutch teeth to engage said first axially extending dentil clutch teeth on said driving member, said first and second axially extending dentil clutch teeth having complementary mutually engageable inclined teeth for transmitting torque between said driving and driven clutch members in one direction of rotation; and means, interposed said driving and driven clutch members, for axially separating said driving clutch member from said driven clutch member when said driven clutch member rotates above a predetermined rotational speed.

9. An engine starter as claimed in claim 8, further comprising:

means, enclosing said separating means, for preventing the ingress of contaminants from said engine and said motor from interfering with the operation of said separating means.

10. An engine starter device as claimed in claim 8 wherein said means for axially separating said driving clutch member from said driven clutch member comprises centrifugally actuated separating means.

11. An engine starter as claimed in claim 8, further comprising:

a barrel housing having an open end and a closed end opposite said open end, said closed end slidably mounted on said outer diameter on said sleeve member, said barrel housing further extending axially so as to spatially enclose said driving and driven clutch members; and abutment means, mounted within said housing adjacent to said open end, for engaging said driven clutch member within said housing and for confining said driving and driven clutch members within said housing.

12. An engine starter as claimed in claim 11, further comprising:

resilient means, mounted within said housing adjacent said closed end and abutting said driving clutch member, for biasing said driving clutch member into engagement with said driven clutch member.

13. An engine starter as claimed in claim 12, further comprising:

means for axially moving said driving clutch member and said driven clutch member such that said pinion gear engages said starter gear.

14. An engine starter as claimed in claim 13, further comprising:

indexing means for shifting said driving and driven clutch members and said pinion gear into engagement with and toward the engine gear to be rotated when said pinion gear abuts the engine gear and the obstructing tooth on the engine gear prevents engagement of said pinion gear with said started gear.

15. In combination with an internal combustion engine of the type having a gear for rotating the engine crankshaft and a starter motor for rotating said gear, said starter motor comprising a rotatable power shaft, a sleeve member coaxially and slidably mounted on said rotatable power shaft, said sleeve member further engaging and rotating with said power shaft, said sleeve member having external helical splines on one end, a driving clutch member coaxially and slidably mounted on said external helical splines on said sleeve member, said driving member having axially extending clutch teeth on one end, a driven clutch member mounted adjacent to said driving clutch member, said driven member having radially extending clutch teeth on one end which includes surfaces engageable with said driving clutch member clutch teeth for transmitting torque in one direction between said driven and driving clutch members, means for keeping the clutch teeth of said driven clutch member in engagement with the clutch teeth of said driving member when said driving member moves in a direction toward said driven clutch member, and means for separating the clutch teeth of said driven member from the clutch teeth of said driving member such that driving clutch member moves in a direction away from said driven clutch member when said driven clutch member rotates above a predetermined speed, wherein the improvement further comprises:

a mounting shaft coaxially mounted adjacent said rotatable power shaft, said mounting shaft having a first end, a second end opposite said first end and a first outer diameter adjacent said first end, said second end connected to the one end of said sleeve member; and a pinion gear mounted on said first outer diameter of said mounting shaft, said pinion gear further moving axially into and out of engagement with the gear of the engine to be started, said pinion gear further secured to said driven clutch member for rotation therewith.

16. The starter gear combination as claimed in claim 15, further comprising:

a barrel housing having an open end and a closed end opposite said open end, said closed end slidably mounted on said outer diameter on said sleeve member, said barrel housing further extending axially so as to spatially enclose said driving and driven clutch members; and abutment means, mounted within said housing adjacent to said open end, for engaging said driven clutch member within said housing and for confining said driving and driven clutch members within said housing.

17. The starter gear combination as claimed in claim 16, further comprising:

resilient means, mounted within said housing adjacent said closed end and abutting said driving clutch member, for biasing said driving clutch member into engagement with said driven clutch member.

18. The starter gear combination as claimed in claim 17, further comprising:

means for axially moving said driving clutch member and said driven clutch member such that said pinion gear engages the engine gear to be rotated.

19. The starter gear combination as claimed in claim 18, further comprising:

indexing means for shifting said driving and driven clutch members and said pinion gear into engagement with and toward the engine gear to be rotated when said pinion gear abuts the engine gear and the obstructing tooth on the engine gear prevents engagement of said pinion gear with the engine gear.

* * * * *

UNITED STATES PATENT AND TRADEMARK OFFICE

CERTIFICATE OF CORRECTION

PATENT NO. : 4,425,812
DATED : January 17, 1984
INVENTOR(S) : James Ola Williams It is certified that error appears in the above-identified patent and that said Letters Patent is hereby corrected as shown below:

Column 1, line 18, after "motor" insert a comma ---- , ----. Same line, after "gearing" insert a comma ---- , ----.

Column 1, line 22, delete the comma ",".

Column 1, line 24, after "driving" insert a comma ---- , ----.

Column 1, line 49, before "Digby" insert ---- James J. ----. Same line, after "1966" insert a comma ---- , ----.

Column 1, line 56, before "etc." insert ---- oil, ----.

Column 2, line 2, after "Mortenson" insert ---- , also owned by the assignee of the present invention. ----.

Column 2, line 3, delete "has" and insert ---- have ----.

Column 2, line 8, delete "is" and insert ---- are ----.

Column 2, line 27, delete "memberfur-" and insert ---- member fur- ----.

Column 2, line 60, delete "the".

Column 3, line 2, before "starter" insert ---- engine ----. Same line, after "gear" insert ---- device ----.

UNITED STATES PATENT AND TRADEMARK OFFICE

CERTIFICATE OF CORRECTION

PATENT NO. : 4,425,812
DATED : January 17, 1984
INVENTOR(S) : James Ola Williams It is certified that error appears in the above-identified patent and that said Letters Patent is hereby corrected as shown below:

Column 3, line 16, delete "when" and insert ---- with ----.

Column 3, line 30, delete "a" and insert ---- an ----.

Column 3, line 31, after "device" insert a comma ---- , ----.

Column 3, line 32, after "100" insert a comma ---- , ----. Same line, before "starter" insert ---- engine ----.

Column 3, line 34, before "starter" insert ---- engine ----.

Column 3, line 39, delete "another" and insert ---- an other ----.

Column 3, line 48, delete "on" (2nd occurr.) and insert --of--

Column 3, line 50, delete "The one" and insert ---- One ----.

Column 3, line 55, after "counterbore 24" insert ---- provided ----.

Column 3, line 62, delete "journaled" and insert ---- journalled ----.

Column 3, line 63, delete "the" and insert ---- a ----.

Column 3, line 67, delete "the", first occurrence, and insert ---- an ----. Same line, before "gear" insert ---- ring ----.

UNITED STATES PATENT AND TRADEMARK OFFICE
CERTIFICATE OF CORRECTION

PATENT NO. : 4,425,812

DATED : January 17, 1984

INVENTOR(S) : James Ola Williams

It is certified that error appears in the above-identified patent and that said Letters Patent is hereby corrected as shown below:

Column 4, line 2, delete "the" (2nd occurr.) and insert --a--.

Column 4, line 4, delete "The second" and insert ---- A second ----.

Column 4, line 6, delete "driving".

Column 4, line 7, after "clutch teeth 34", insert ---- of the driving clutch member 20. ----.

Column 4, line 9, delete "36 respectively" and insert ---- 36, respectively, ----.

Column 4, line 13, delete "end 33" and insert ---- end portion 33 ----.

Column 4, line 14, after "counterbore 32" insert ---- provided ----.

Column 4, line 24, delete "members 20, 30 respectively" and insert ---- members 20 and 30, respectively, ----.

Column 4, line 26, delete "driving" and insert ---- driven ----.

Column 4, line 30, delete "the thrust" and insert ---- a thrust ----.

UNITED STATES PATENT AND TRADEMARK OFFICE

CERTIFICATE OF CORRECTION

PATENT NO. : 4,425,812

DATED : January 17, 1984

INVENTOR(S) : James Ola Williams

It is certified that error appears in the above-identified patent and that said Letters Patent is hereby corrected as shown below:

Column 4, line 43, delete "starter gearing" and insert ---- engine starter gear ----.

Column 4, line 45, before "gear" insert ---- ring ----.

Column 4, line 47, delete "the", first occurrence, and insert ---- a ----.

Column 4, line 54, delete "comprises" and insert ---- includes an ----.

Column 4, line 55, delete "having" and insert ---- which has ----.

Column 4, line 56, delete "against the" and insert ---- against a ----.

Column 4, line 57, delete "the radially" and insert ---- a radially ----.

Column 4, line 62, delete "the radial" and insert ---- a radial ----.

Column 5, line 10, before "pin 71" insert ---- support ----.

Column 5, line 11, before "hole 79" insert ---- radial ----.

UNITED STATES PATENT AND TRADEMARK OFFICE

CERTIFICATE OF CORRECTION

PATENT NO. : 4,425,812

DATED : January 17, 1984

INVENTOR(S) : James Ola Williams

It is certified that error appears in the above-identified patent and that said Letters Patent is hereby corrected as shown below:

Column 5, line 12, before "hole" insert ---- radial ----.

Column 5, line 18, delete "member" (2nd occurr.) and insert --members--.

Column 5, line 19, delete "pin 30" and insert ---- pin 71 ----.

Column 5, line 20, before "ring" insert ---- annular ----.

Column 5, line 26, before "starter" insert ---- engine.

Column 5, line 27, delete "gear 90" and insert ---- gear 98 ----.

Column 5, line 28, delete "shift" and insert ---- shaft ----.

Column 5, line 29, before "starter" insert ---- engine ----.

Column 5, line 32, before "starter" insert ---- engine ----.

Column 5, line 47, before "gear" insert ---- ring ----.

Column 5, line 54, delete "ring 72" and insert ---- ring member 72 ----.

Column 5, line 57, before "surfaces 76" insert ---- the inclined ----.

Column 5, line 59, delete "force on" and insert ---- force on the ----. Same line, after "ring" insert ---- member ----.

UNITED STATES PATENT AND TRADEMARK OFFICE

CERTIFICATE OF CORRECTION

PATENT NO. : 4,425,812

DATED : January 17, 1984

INVENTOR(S) : James Ola Williams

It is certified that error appears in the above-identified patent and that said Letters Patent is hereby corrected as shown below:

Column 5, line 60, delete "ring 72" and insert ---- ring member 72 ----.

Column 5, line 61, delete "collar 74" and insert ---- collar member 74 ----.

Column 5, line 64, delete "causes" and insert ---- causing ----.

Column 5, line 68, delete "teeth 32" and insert ---- teeth 34 ----.

Column 6, line 9, delete "the starter" and insert ---- the engine starter gear device ----.

Column 6, line 16, delete "housing 38" and insert ---- barrel shaped housing 38 ----.

Column 6, line 20, delete "driven" and insert ---- driving ----.

Column 6, line 21, delete "driving" and insert ---- driven ----.

Column 6, line 30, after "ring gear 98" insert a comma ---- , ----.

Column 6, line 36, delete "teeth 34," and insert ---- teeth 34 and ----.

Column 6, line 39, delete "spring 50" and insert ---- helical biasing member 50 ----.

UNITED STATES PATENT AND TRADEMARK OFFICE

CERTIFICATE OF CORRECTION

PATENT NO. : 4,425,812

DATED : January 17, 1984

INVENTOR(S) : James Ola Williams

It is certified that error appears in the above-identified patent and that said Letters Patent is hereby corrected as shown below:

Column 6, line 40, delete "driven and driving" and insert ---- driving and driven ----.

Column 6, line 57, before "pinion" insert ---- the ----.

Column 6, line 59, delete "spring 50" and insert ---- helical biasing member 50 ----.

Column 6, line 60, before "outer" insert ---- first ----.

In the Claims

Column 7, line 31, before "starter" (2nd occurr.) insert --engine--.

Column 7, line 33, after "sleeve" insert ---- member ----.

Column 7, line 62, after "driving" insert ---- clutch ----.

Column 8, line 1, before "means," insert ---- separating ----.

Column 8, line line 13, before "means" insert --separating--.

Column 8, line 53, after "sleeve" insert ---- member ----.

Column 8, line 57, delete "and outer" and insert ---- and an outer ----.

UNITED STATES PATENT AND TRADEMARK OFFICE
CERTIFICATE OF CORRECTION

PATENT NO. : 4,425,812

DATED : January 17, 1984

INVENTOR(S) : James Ola Williams

It is certified that error appears in the above-identified patent and that said Letters Patent is hereby corrected as shown below:

Column 9, line 14, after "driving" insert ---- clutch ----.

Column 9, line 19, before "means," insert ---- separating ----.

Column 9, line 30, before "means" insert ---- separating ----.

Column 10, line 10, delete "radially" and insert ---- axially ----.

Signed and Sealed this

*Fourth* Day of *September 1984*

[SEAL]

*Attest:*

GERALD J. MOSSINGHOFF

*Attesting Officer* *Commissioner of Patents and Trademarks*